United States Patent
Hu et al.

(10) Patent No.: US 9,892,285 B2
(45) Date of Patent: Feb. 13, 2018

(54) ACCESSORY, ELECTRONIC APPARATUS AND SYSTEM FOR ACCESSORY CERTIFICATION

(71) Applicant: JRD COMMUNICATION INC., Shenzhen (CN)

(72) Inventors: Xuelong Ronald Hu, Shenzhen (CN); Aiping Guo, Shenzhen (CN); Shiqing Zhao, Shenzhen (CN)

(73) Assignee: TCL COMMUNICATION TECHNOLOGY HOLDINGS LIMITED, Kowloon (HK)

( * ) Notice: Subject to any disclaimer, the term of this patent is extended or adjusted under 35 U.S.C. 154(b) by 29 days.

(21) Appl. No.: 14/902,307

(22) PCT Filed: Apr. 13, 2015

(86) PCT No.: PCT/CN2015/076459
§ 371 (c)(1),
(2) Date: Dec. 30, 2015

(87) PCT Pub. No.: WO2016/095376
PCT Pub. Date: Jun. 23, 2016

(65) Prior Publication Data
US 2016/0300082 A1 Oct. 13, 2016

(30) Foreign Application Priority Data
Dec. 15, 2014 (CN) .......................... 2014 1 0779695

(51) Int. Cl.
H04L 29/06 (2006.01)
G06F 21/85 (2013.01)
(Continued)

(52) U.S. Cl.
CPC .............. *G06F 21/85* (2013.01); *G06F 21/44* (2013.01); *H04L 9/14* (2013.01); *H04L 9/30* (2013.01); *H04L 9/32* (2013.01)

(58) Field of Classification Search
CPC ..... H04L 9/14; H04L 9/30; H04L 9/32; G06F 21/85; G06F 21/44
See application file for complete search history.

(56) References Cited

U.S. PATENT DOCUMENTS

2010/0281265 A1* 11/2010 Ogawa ..................... G06F 21/10
713/176
2013/0091362 A1* 4/2013 Poeluev ................. H04L 9/0841
713/179
(Continued)

FOREIGN PATENT DOCUMENTS

| CN | 103440462 A | 11/2013 |
|----|-------------|---------|
| CN | 103905183 A | 2/2014 |
| CN | 103914658 A | 9/2014 |

*Primary Examiner* — Ghodrat Jamshidi
(74) *Attorney, Agent, or Firm* — Shimokaji IP

(57) ABSTRACT

An accessory, an electronic apparatus and a system for accessory certification is disclosed. The accessory comprises an encryption chip, with the encryption chip comprising a first memory module, configured to store a private certification key and a mixed certification key formed at least by combining a public certification key and pseudo keys according to a predetermined rule. The processing module of the electronic apparatus at least extracts the public certification key from the mixed certification key according to an algorithm matched with the predetermined rule when the electronic apparatus and the accessory are forming a physical connection. The processing module uses the public certification key to certify the accessory. In such a manner, the present invention can improve the security level of keys so as to improve the security and reliability for the electronic apparatus to use the accessory.

20 Claims, 1 Drawing Sheet

(51) Int. Cl.
*H04L 9/30* (2006.01)
*H04L 9/32* (2006.01)
*H04L 9/14* (2006.01)
*G06F 21/44* (2013.01)

(56) References Cited

U.S. PATENT DOCUMENTS

2014/0108824 A1    4/2014  Nagai et al.
2014/0223174 A1*  8/2014  Krishnamurthy ... H04L 63/0823
                                                    713/158

* cited by examiner

ACCESSORY, ELECTRONIC APPARATUS AND SYSTEM FOR ACCESSORY CERTIFICATION

TECHNICAL FIELD

The present invention relates to the field of electronic technologies, and in particular relates to an accessory, an electronic apparatus and a system for accessory certification.

BACKGROUND

In daily use, an electronic apparatus, such as a cell phone or a tablet, may often use related accessories (including attachments), for example, for charging by connecting to a charger, data transmission by connecting to a data cable, and listening by connecting to earphones.

When an electronic apparatus is connected to and uses an accessory, it is possible to damage the electronic apparatus, or even cause severe accidents like personal injuries, if the accessory has an inferior quality. In addition, there are more and more illegitimate manufacturers using inferior materials or lax processes to produce accessories, making it difficult to ensure the quality of accessories. If faulty accessories produced by these illegitimate manufacturers are used, it may be even easier to damage electronic apparatuses or cause severe casualty accidents. Reports have shown that death caused by electrical creepage, or damage to electronic apparatuses, burning and other incidents occur from time to time due to the use of faulty chargers in charging, which have resulted in significant risk and safety hazard for users of electronic apparatuses.

Before an accessory is used by an electronic apparatus, the accessory may be certified first so as to determine if the accessory is a legitimate accessory. When the accessory passes the certification, the electronic apparatus may use the functions of the accessory. If the accessory fails the certification, the electronic apparatus may not be connected to the accessory for its functions, and therefore will not use the accessory, thereby ensuring that legitimate accessories can be used by electronic apparatuses. In the existing methods for accessory certification, asymmetric encryption algorithms are often used for accessory certification. Two keys may be required in an asymmetric encryption algorithm, a public key and a private key. When the public key is used for encryption, decryption can only be performed with the matching private key. When the private key is used for encryption, decryption can only be performed with the matching public key. The public key is public, while the private key is only known to the decrypting party.

The public key and the private key may be stored directly in a secure part of a memory, i.e. the public key and the private key may not be processed. When the public key and the private key are used for encryption and decryption, they just need to be directly retrieved from the memory. Such a storage manner lowers the security level of the public key and the private key, and it may be easy for hackers to break the keys. In particular, if the public key is broken by hackers, it is possible to result in errors in the entire accessory certification and to certify illegitimate accessories as legitimate accessories.

SUMMARY

In an embodiment of the invention, an accessory, an electronic apparatus and a system for accessory certification are provided, which can improve the security level of keys so as to improve the security and reliability for the electronic apparatus to use the accessory.

In an embodiment, an accessory is provided, comprising an encryption chip, the encryption chip comprising a first memory module; wherein the first memory module is configured to store a private certification key and a mixed certification key formed at least by combining a public certification key and pseudo keys according to a predetermined rule, such that the processing module of an electronic apparatus at least extracts the public certification key from the mixed certification key according to an algorithm matched with the predetermined rule when the electronic apparatus and the accessory are forming a physical connection, and uses the public certification key to certify the accessory; the encryption chip further comprises a counting module and a key generation module connected to the first memory module, configured to generate the private certification key, the public certification key and the pseudo keys when the accessory and the electronic apparatus form a physical connection, and at least combine the public certification key and the pseudo keys according to a predetermined rule to obtain the mixed certification key, wherein the public certification key and the private certification key generated by the key generation module are different each time the accessory and the electronic apparatus form a physical connection; wherein the counting module is configured to accumulate and store the number of times that the accessory is certified.

In an embodiment, the encryption chip further comprises a decryption module; wherein the key generation module is configured to combine the private certification key, the public certification key and the pseudo keys based on a predetermined rule to obtain the mixed certification key, and to save the mixed certification key in the first memory module; wherein the decryption module is configured to receive the private certification key extracted by the processing module from the mixed certification key based on an algorithm matched with the predetermined rule, and the decryption module uses the private certification key to certify the accessory.

In an embodiment, the encryption chip has a unique serial number.

In an embodiment, an electronic apparatus is provided, comprising a processing module, the processing module being configured to, upon the electronic apparatus and the accessory forming a physical connection, read a mixed certification key formed at least by combining a public certification key and pseudo keys according to a predetermined rule from the first memory module in the encryption chip of the accessory, and extract the public certification key from the mixed certification key based on an algorithm matched with the predetermined rule to use the public certification key to certify the accessory.

In an embodiment, a system for accessory certification is provided, comprising an accessory and an electronic apparatus, the accessory comprising an encryption chip, the encryption chip comprising a first memory module, and the electronic apparatus comprising a processing module; wherein the first memory module is configured to store a private certification key and a mixed certification key formed by combining a public certification key and pseudo keys according to a predetermined rule; wherein the processing module extracts the public certification key from the mixed certification key based on an algorithm matched with the predetermined rule when the accessory and the electronic apparatus form a physical connection, and the processing module uses the public certification key to certify the accessory.

In an embodiment, the encryption chip further comprises a key generation module connected to the first memory module, configured to generate the public certification key, the private certification key and the pseudo keys when the accessory and the electronic apparatus form a physical connection, and the encryption chip combines the public certification key and the pseudo keys according to a predetermined rule to obtain the mixed certification key, wherein the public certification key and the private certification key generated by the key generation module are different each time the accessory and the electronic apparatus form a physical connection.

In an embodiment, the encryption chip further comprises a decryption module; wherein the key generation module is configured to combine the private certification key, the public certification key and the pseudo keys according to a predetermined rule to obtain the mixed certification key, and to save the mixed certification key in the first memory module; wherein the processing module is configured to extract the private certification key from the mixed certification key based on an algorithm matched with the predetermined rule, and the processing module sends the private certification key to the decryption module, wherein the decryption module is configured to receive the private certification key, and use the private certification key to certify the accessory.

In an embodiment, the encryption chip further comprises a counting module, the counting module being configured to accumulate and store the number of times that the accessory is certified.

Unlike the prior art, the accessory according the present invention is provided with an encryption chip, wherein the encryption chip is configured to store a private certification key and a mixed certification key formed by combining a public certification key and pseudo keys based on a predetermined rule, wherein, when the electronic apparatus and the accessory form a physical connection, the public certification key is extracted from the mixed certification key based on an algorithm matched with the predetermined rule. The public certification key can be used to certify the accessory, by mixing the public certification key with the pseudo keys and using the pseudo keys to hide the public certification key. The probability that the key is broken by a hacker can be lowered, which improves the security level of the key.

DETAILED DESCRIPTION

The present invention will be described in detail below with reference to the accompanying drawings and specific embodiments.

Figure 1:
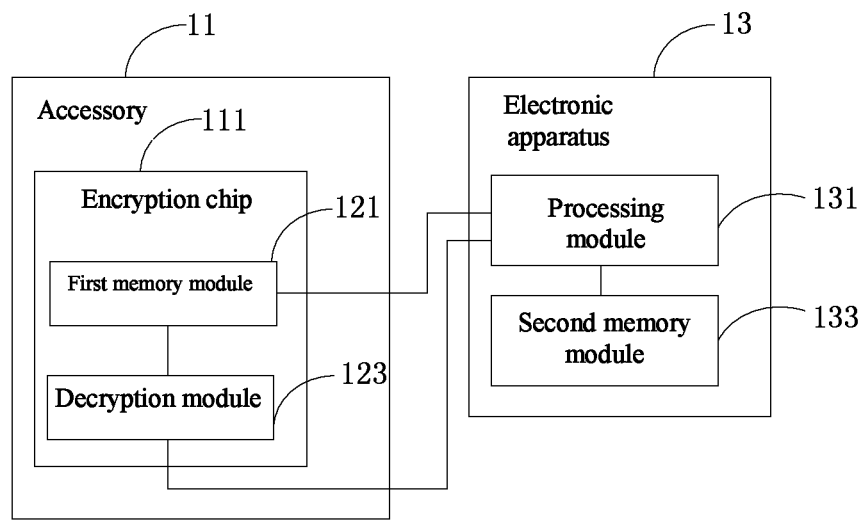
FIG. 1 illustrates the structure of one embodiment of a system for accessory certification according to the present invention.

Referring to FIG. 1, one embodiment of the system for accessory certification according to the present invention comprises an accessory 11 and an electronic apparatus 13. The accessory 11 may, for example, be a charger, a data cable, or earphones, and the electronic apparatus 13 may be a cell phone, a tablet or other electronic apparatus.

The accessory 11 may comprise an encryption chip 111 to implement the encryption function on the accessory. The encryption chip 111 may comprise a first memory module 121 and a decryption module 123, wherein the first memory module 121 is configured to store a private certification key and a mixed certification key formed by combining a public certification key and pseudo keys. In an embodiment, an asymmetric encryption algorithm and a method of true and false keys may be used at the same time to encrypt the accessory 11. The asymmetric encryption algorithm may use two keys, i.e. a public certification key and a private certification key. The public certification key and the private certification key may be a pair of verification keys. If the public certification key is used for encryption, decryption can only be performed with the corresponding private certification key, and if the private certification key is used for encryption, decryption can only be performed with the corresponding public certification key.

In an embodiment, the mixed certification key stored in the first memory module 121 is key data obtained by mixing the public certification key and the pseudo keys according to a predetermined rule.

In an embodiment, the public certification key and pseudo keys may be combined in the way that the public certification key and a plurality of pseudo keys are arranged, for example, the true public certification key is A, and the pseudo keys are B1, B2, B3 and B4. The five keys, A, B1, B2, B3 and B4, can be arranged according to an order. If A is arranged at the third position, the arrangement order of the five keys can be B1, B2, A, B3 and B4, and then the data obtained after the combination is stored in the first memory module 201 to obtain the mixed certification key.

The electronic apparatus 13 may comprise a processing module 131. The processing module 131 can be configured to, when the electronic apparatus 13 and the accessory 11 form a physical connection (i.e. electrical connection and prior to implementation of the functional connection), read a mixed certification key from the first memory module 121, extract the public certification key from the mixed certification key according to a predetermined algorithm, and use the public certification key to verify if the accessory is a legitimate accessory. The connection between the electronic apparatus 13 and the accessory 11 may be a wired connection (e.g. connection through a USB channel), or may be a wireless connection.

In an embodiment, the predetermined algorithm may be an algorithm matched with the predetermined rule, the algorithm and the predetermined rule may be developed by electronic apparatus manufacturers and legitimate accessory manufacturers through consultation, and the predetermined rule may be only known to the electronic apparatus manufacturers and legitimate accessory manufacturers. With the above combination of the public certification key A and four pseudo keys B1, B2, B3 and B4 as an example, the combination of the public certification key A and the pseudo keys may be arranged similar to B1, B2, A, B3 and B4, and as a result, the processing module 301 may extract the key at the third position from the mixed certification key according to the predetermined rule, and thus obtain the true public certification key. By mixing the true public certification key with the pseudo keys and using the pseudo keys to hide the true public certification key, it is difficult to learn which one is the true public certification key, unless the combination of the public certification key and pseudo keys is known, thereby improving the security level of the public certification key, because it is difficult for hackers to find the true public certification key, and the probability that the key is broken by a hacker is lowered, thereby ensuring the reliability of the keys.

To further determine that the used public certification key is correct, i.e. to ensure that the public certification key has not been tampered with, the electronic apparatus 13 may further comprise a second memory module 133 configured to store a public verification key, the public verification key forming a pair of verification keys with the private certification key. After acquiring the public certification key from the mixed certification key, the processing module 131 may use the public verification key to verify the public certification key, i.e. compare the public certification key with the public verification key, and when the public certification key is consistent with the public verification key, the public certification key is verified to be the correct public certification key, and consequently the processing module 131 may use the verified public certification key to certify the accessory.

During the certification process, the processing module 131 may use the public certification key to encrypt messages, and send the encrypted messages to the accessory 11. The decryption module 123 of the accessory 11 receives the encrypted messages, uses the private certification key to decrypt the received messages, and then sends the decrypted messages as a response to the processing module 131. The processing module 131 may determine if the response is appropriate. If it is appropriate, the accessory 11 may be certified to be a legitimate accessory. After the accessory 11 is certified to be a legitimate accessory, the electronic apparatus 13 and the accessory 11 may consequently change from a physical connection to a functional connection. The electronic apparatus 13 may use the functions of the accessory 11, such as, for example, charging, transmitting data, etc. If the accessory 11 is not certified, then the accessory 11 may be prohibited from being used. As a result, the accessory 11 may be certified before the accessory 11 is used, so as to determine if the accessory 11 is an original or legitimate accessory. The functions of the accessory 11 can be used only after it is determined to be an original or legitimate accessory, thus ensuring that the accessory used by the electronic apparatus 13 is a legitimate accessory, and improving the security and reliability for the electronic apparatus 13 to use the accessory 11.

In an embodiment, the data channel for encryption and decryption during the certification process may be realized by using the existing connection channel between the electronic apparatus 13 and the accessory 11. The electronic apparatus 13 may be provided with an external communication port, such as a USB, UART, etc., and the existing communication port may be used for data transmission, like keys, data and control commands, between the electronic apparatus 13 and the accessory 11, so as to make a full use of existing resources to certify the accessory 11.

In an embodiment, the accessory 11 may have the encryption function, and the accessory 11 may be provided with the encryption chip 111 to implement the certification of the accessory 11. This not only can improve the security for the electronic apparatus 13 to use the accessory 11, but also can improve the security level of the key by using the encryption algorithm to hide the true public certification key with pseudo keys, thus preventing the true key from being broken by a hacker. With the encryption chip 111, moreover, the accessory 11 can be tracked, identified and determined, which can facilitate the management of the accessory 11.

In other embodiments, the public certification key and pseudo keys can also be combined according to other predetermined rules. For example, data can be mixed to form the public certification key into pseudo keys, and then an electronic apparatus can extract data at predetermined positions, and recombine the data to obtain the public certification key. For example, if the public certification key is 1100 and the pseudo key is 2222, the four digits of the public certification key can be mixed into the four digits of the pseudo key according to predetermined positions, and a string of eight digit number can be obtained. The eight digit number may be for example 12212020, and at this time, the electronic apparatus may extract the Position 1, Position 4, Position 6 and Position 8 digits based on the predetermined algorithm, and the extracted numbers can be recombined to obtain the public certification key. As it is difficult for a hacker to learn the combination rule of the public certification key and pseudo keys, it can be difficult to find the true public certification key, thereby improving the security level of keys and lowering the probability of being broken by a hacker.

In other embodiments, the private certification key may also be mixed into pseudo keys. The first memory module can be configured to store a mixed certification key formed by combining a private certification key, a public certification key and pseudo keys according to a predetermined rule. In this case, when the accessory and the electronic apparatus form a physical connection, the processing module of the electronic apparatus can extract the public certification key and the private certification key from the mixed certification key according to a predetermined algorithm, and can send the private certification key to the decryption module. Consequently, the decryption module can use the private certification key for decryption and to certify the accessory. In the above-described manner, the public certification key and the private certification key can be protected from being broken into by a hacker, thereby improving the security level of the keys.

In another embodiment, a random key can be used to certify the accessory, so as to improve the reliability of certification and further ensure that the accessory used by the electronic apparatus is a legitimate accessory. Specifically referring to FIG. 2, the encryption chip 211 can further comprise a key generation module 225 connected to the first memory module 221. The key generation module 225 can be configured to generate the private certification key, the public certification key and the pseudo keys when the accessory 21 and the electronic apparatus 23 form a physical connection, and combine the public certification key and the pseudo keys based on a predetermined rule to obtain the mixed certification key. In an embodiment, the key generation module 225 can be configured to combine the private certification key, the public certification key and the pseudo keys according to a predetermined rule to obtain the mixed certification key, and the first memory module 221 can be configured to store a mixed certification key formed by combining the private certification key, the public certification key and the pseudo keys.

In addition, the key generation module 225 can generate the public certification key and the private certification key in a manner of random key generation, i.e. the private certification key and the public certification key generated by the key generation module 225 can be different each time the accessory 21 and the electronic apparatus 23 form a physical connection. For example, when the accessory 21 and the electronic apparatus 23 form a physical connection for the first time, the private certification key and the public certification key generated by the key generation module 225 may be CD, and when the accessory 21 and the electronic apparatus 23 form a physical connection for the second time, the private certification key and the public certification key generated by the key generation module 225 may be a key pair EF that is different from the key pair CD.

Furthermore, the generation mode can be different each time the key generation module 225 generates a key pair. It can generate the private certification key and the public certification key based on the number of times that the accessory is certified. Thus, by simultaneously applying an asymmetric encryption algorithm, a true and false key algorithm and a random key algorithm on the accessory encryption, it can be difficult for a hacker to find the key and identify the rule of key generation, which further improves the security of the keys and effectively protects the keys from hacker attacks.

In an embodiment, when the accessory 21 is certified, the processing module 231 of the electronic apparatus 23 can read a mixed certification key from the first memory module 221, extract the public certification key and the private certification key from the mixed certification key according to an algorithm matched with the predetermined rule, and send the private certification key to the decryption module 223. Subsequently, the processing module 231 can use the public verification key to verify the extracted public certification key, and when the public certification key is verified, the processing module 231 can use the public certification key to encrypt messages, and send the encrypted messages to the decryption module 223. The decryption module 223 can use the private certification key sent by the processing module 231 to decrypt the received encrypted messages, and send the decrypted messages as a response to the processing module 231. The processing module 231 can determine if the response is correct. If the response is correct, the accessory 21 is certified, and the electronic apparatus 23 may use the functions of the accessory 21; otherwise, the accessory 21 will be prohibited from being used, thereby ensuring that the accessory 21 used by the electronic apparatus 23 is a legitimate accessory and improving the security and reliability of the electronic apparatus.

In an embodiment, the decryption module 223 can read a mixed certification key from the first memory module 221, and extract the private certification key from the mixed certification key to use the private certification key for decryption; alternatively, the decryption module 223 can extract the public certification key and the private certification key from the mixed certification key, and send the public certification key to the processing module 231, such that the processing module 231 uses the public certification key to certify the accessory 21.

Figure 2:
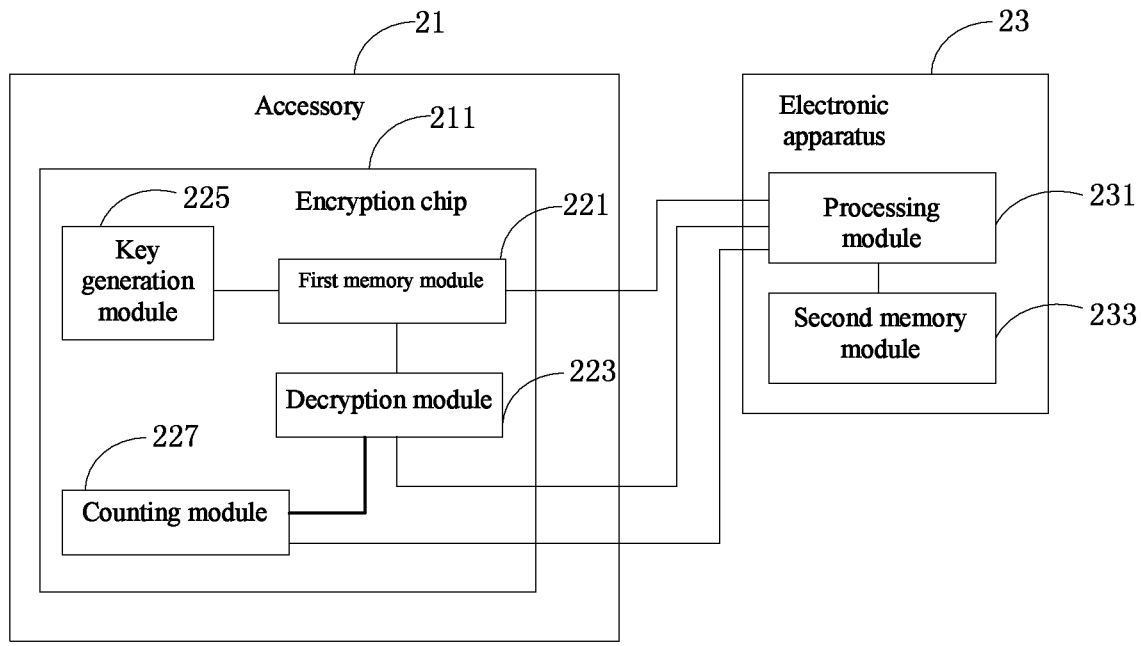
FIG. 2 illustrates the structure of another embodiment of the system for accessory certification according to the present invention.

In FIG. 2, in an embodiment, the encryption chip 211 may further comprise a counting module 227. The counting module 227 can be configured to accumulate and store the number of times that the accessory 21 is certified. When the decryption module 223 has a decryption event, the counting module 227 increases by "1" upon detecting the decryption event of the decryption module 223, thereby achieving the accumulation of the number of times of certification. The processing module 231 of the electronic apparatus 23 may read the number of times that the accessory 21 is certified and carry out related processing based on the number of times of certification. For example, the number of times that the accessory 21 is used can be learned according to the number of times of certification, and thus fee collection management can be performed, or the life of the accessory 21 can be calculated according to the number of times of certification.

In addition, the counting module 227 may be further configured to calculate the use time of the accessory 21, so as to determine the approximate life of the accessory 21.

In an embodiment, the encryption chip of the accessory can have a unique serial number, which can facilitate the management and authenticity identification on accessories. Before the electronic apparatus uses a key to certify the accessory, the processing module may identify if the accessory is a counterfeit and inferior product by acquiring the serial number of the encryption chip. For example, the processing module can compare the acquired serial number with the correct serial number through the network cloud, so as to determine the authenticity of the acquired serial number, and after the authenticity identification, the serial number can be labeled and managed, thereby rapidly determining the authenticity of a serial number through the labeled information.

By providing a unique serial number to the encryption chip, the uniqueness and exclusiveness of the accessory can be guaranteed, which can add a hardware barrier for subsequent accessory certification.

The present invention further provides an embodiment of the accessory, and the accessory is the accessory set forth in any one of the above embodiments.

The present invention further provides an embodiment of the electronic apparatus, and the electronic apparatus is the electronic apparatus set forth in any one of the above embodiments.

Only embodiments of the present invention are described above, which are not intended to limit the scope of the present invention. Any equivalent structure or equivalent procedure variation made according to the Specification and Drawings of the present invention, or direct or indirect applications in other related technical fields, shall similarly be encompassed by the present invention.

The invention claimed is:

1. An accessory, comprising an encryption chip;
    wherein the encryption chip is configured to store a private certification key and a mixed certification key formed at least by combining a public certification key and pseudo keys according to a predetermined rule, wherein an electronic apparatus at least extracts the public certification key from the mixed certification key according to an algorithm matched with the predetermined rule when the electronic apparatus and the accessory are forming a physical connection, and the electronic apparatus uses the public certification key to certify the accessory;
    wherein the encryption chip is further configured to generate the private certification key, the public certification key and the pseudo keys when the accessory and the electronic apparatus are forming a physical connection, wherein the encryption chip combines the public certification key and the pseudo keys according to a predetermined rule to obtain the mixed certification key, wherein the public certification key is mixed with a first set of the pseudo keys and the private key is mixed with a second set of the pseudo keys;
    wherein the public certification key and the private certification key are different each time the accessory and the electronic apparatus form a physical connection; and
    the encryption chip is configured to accumulate and store a number of times that the accessory is certified.

2. The accessory according to claim 1, wherein,
the encryption chip is configured to combine the private certification key, the public certification key and the pseudo keys according to a predetermined rule to obtain the mixed certification key; and
the encryption chip is configured to receive the private certification key extracted by the electronic apparatus from the mixed certification key according to an algorithm matched with the predetermined rule, and the encryption chip uses the private certification key to certify the accessory.

3. The accessory according to claim 1, wherein, the encryption chip has a unique serial number.

4. The accessory according to claim 1, wherein the public certification key is generated based on a number of times that the accessory is certified.

5. The accessory according to claim 1, wherein the accessory is prohibited from being used until it is certified.

6. An electronic apparatus,
wherein the electronic apparatus is configured to, upon the electronic apparatus and an accessory forming a physical connection, read a mixed certification key formed at least by combining a public certification key and a first set of pseudo keys according to a predetermined rule in the encryption chip of the accessory, and the electronic apparatus extracts the public certification key from the mixed certification key according to an algorithm matched with the predetermined rule so as to use the public certification key to certify the accessory;
wherein the mixed certification key also includes a private key that is mixed with a second set of the pseudo keys.

7. The electronic apparatus according to claim 6, wherein a connection between the electronic apparatus and the accessory changes from a physical connection to a functional connection.

8. The electronic apparatus according to claim 6, wherein, the encryption chip has a unique serial number.

9. The electronic apparatus according to claim 6, wherein the accessory is prohibited from being used until it is certified.

10. The electronic apparatus according to claim 6, wherein the accessory is certified through an external communication port.

11. The electronic apparatus according to claim 6, wherein a random key is used to certify the accessory.

12. The electronic apparatus according to claim 6, wherein the private certification key is generated based on a number of times that the accessory is certified.

13. A system for accessory certification comprising an accessory and an electronic apparatus, the accessory comprising an encryption chip;
wherein the encryption chip is configured to store a private certification key and a mixed certification key formed by combining a public certification key and first pseudo keys according to a predetermined rule, wherein the private certification key is mixed with second pseudo keys; and
wherein the electronic apparatus extracts the public certification key from the mixed certification key based on an algorithm matched with the predetermined rule when the accessory and the electronic apparatus form a physical connection, and the electronic apparatus uses the public certification key to certify the accessory.

14. The system according to claim 13, wherein,
the encryption chip is further configured to generate the public certification key, the private certification key and the first pseudo keys when the accessory and the electronic apparatus form a physical connection, and combine the public certification key and the first pseudo keys according to a predetermined rule to obtain the mixed certification key, wherein the public certification key and the private certification key are different each time when the accessory and the electronic apparatus form a physical connection.

15. The system according to claim 14,
wherein the encryption chip is configured to combine the private certification key, the public certification key and the first pseudo keys according to a predetermined rule to obtain the mixed certification key; and
the electronic apparatus is configured to extract the private certification key from the mixed certification key based on an algorithm matched with the predetermined rule, and the electronic apparatus is configured to use the private certification key to certify the accessory.

16. The system according to claim 13, wherein, the encryption chip is configured to accumulate and store a number of times that the accessory is certified.

17. The system according to claim 13, wherein, the encryption chip has a unique serial number.

18. The system according to claim 13, wherein a connection between the electronic apparatus and the accessory changes from a physical connection to a functional connection.

19. The system according to claim 13, wherein the accessory is certified through an external communication port.

20. The system according to claim 13, wherein a random key is used to certify the accessory.

* * * * *